United States Patent [19]

Han

[11] Patent Number: 5,313,520

[45] Date of Patent: May 17, 1994

[54] METHOD AND DEVICE FOR PROTECTING DATA OF ROM

[75] Inventor: Dae K. Han, Kyungki, Rep. of Korea

[73] Assignee: Gold Star Electron Co., Ltd., Chungcheongbuk, Rep. of Korea

[21] Appl. No.: 11,105

[22] Filed: Jan. 29, 1993

Related U.S. Application Data

[63] Continuation of Ser. No. 665,987, Mar. 7, 1991, abandoned.

[30] Foreign Application Priority Data

Mar. 9, 1990 [KR] Rep. of Korea ............... 3159/1990

[51] Int. Cl.$^5$ ............................................. H04L 9/00
[52] U.S. Cl. ............................................. 380/4; 380/23; 380/25; 380/49; 380/50; 340/825.31; 340/328.34
[58] Field of Search ............... 380/3, 4, 23, 25, 50, 380/49; 340/825.31, 825.34

[56] References Cited

U.S. PATENT DOCUMENTS

| | | | |
|---|---|---|---|
| 3,609,697 | 9/1971 | Blevins et al. | 364/200 |
| 4,128,874 | 12/1978 | Pertl et al. | 364/200 |
| 4,211,919 | 7/1980 | Ugon | 380/23 X |
| 4,458,315 | 7/1984 | Uchenick | 364/200 |
| 4,471,163 | 9/1984 | Donald et al. | 380/4 |
| 4,471,216 | 9/1984 | Herve | 380/23 X |
| 4,593,353 | 6/1986 | Pickholtz | 364/200 |
| 4,609,777 | 9/1986 | Cargile | 380/4 |
| 4,652,990 | 3/1987 | Pailen et al. | 364/200 |
| 4,716,586 | 12/1987 | Baver | 380/3 |
| 4,757,468 | 7/1988 | Domenik et al. | 364/900 |

OTHER PUBLICATIONS

HCMS 400 Series Handbook, Hitachi America Ltd., pp. 63–117 (Mar. 1988).

Primary Examiner—Bernarr E. Gregory
Attorney, Agent, or Firm—Faegre & Benson

[57] ABSTRACT

A method and a device are provided for protecting data stored in a ROM of a microprogram control unit. Such data may take the form of a user program. To protect the data, predetermined code data is written into a predetermined address in the ROM. A code address inputted from outside the microprogram control unit is then compared with the predetermined address. If the inputted code address is determined to match the predetermined address, then code data inputted from outside the microprogram control unit is compared with the predetermined code data. Only after both of these comparisons are successfully made is the data in the ROM allowed to be read outside the microprogram control unit.

10 Claims, 3 Drawing Sheets

METHOD AND DEVICE FOR PROTECTING DATA OF ROM

This is a continuation of copending application Ser. No. 07/665,987 filed on Mar. 7, 1991, now abandoned.

BACKGROUND OF THE INVENTION

1. Field of the Invention

The present invention relates to a method and a device for protecting ROM data which is a built-in user program of the microprogram control unit (MCU) and which provides high security.

2. Description of the Prior Art

A conventional protective device for ROM data is shown in FIG. 1.

FIG. 1 shows that the conventional protective device for ROM data consists of a specific register 30 inside the MCU 1, a control pin 31 for reading data in ROM 32, which is a user program, out of chip, a port control circuit 32, internal bus 33, data bus 34 and AND gate 35.

In the above construction, the output signal from AND gate 35 converts to high state when a high signal is inputted to control pin 31 and is written to specific register 30 simultaneously, and then the high signal enables port control circuit 32. Therefore, the data stored in ROM 2 was outputted through internal bus 33, port control circuit 32 and data bus 34 in turn.

This construction of the conventional protective device for ROM data has a problem that the protection of a user program is difficult, since the setting of control pin 31 and register 30 inside the MCU 1 was made by the same signal, making it possible for the data stored in ROM 2 to be read easily outside.

SUMMARY OF THE INVENTION

The object of the invention is to provide a method and a device for protecting ROM data which have no problem as stated above.

Firstly, the method for protecting data stored in ROM according to the invention includes the following steps of:

writing a secret code into the user program and specific address in ROM, respectively, checking whether the inputted secret code address agrees with that stored in ROM;

checking whether the inputted secret code data agrees with that stored in ROM when the secret code addresses agree with each other;

checking the state of status bit and operating input-output bus normally when the secret code data agree with each other.

Secondly, the device for protecting data stored in ROM according to the invention comprises the following circuits of:

a secret code address comparison circuit which checks whether a secret code address from outside agrees with that written previously in ROM, outputs an address matching signal and said secret code address;

a ROM 2 which inputs the secret code address from said secret code address comparison circuit and outputs a secret code data;

a comparison circuit which compares said secret code data from ROM from outside and, when they agree with each other, outputs a secret code data matching signal to enable a status bit to be outputted to outside and, at the same time, checks a state of status, outputs a address reset signal to enable data stored in ROM to be read to outside when said state of status becomes a predetermined state; and a program counter which resets by said address resets signal, activates against said secret code address comparison circuit by a mode control signal from outside.

Thus, the user program, ROM data can be protected dually by not only data but also address, in which a secret code is stored respectively.

DETAILED DESCRIPTION OF THE INVENTION

The device for protecting data stored in ROM according to the invention will be described with reference to the accompanying FIG. 2.

Figure 1:
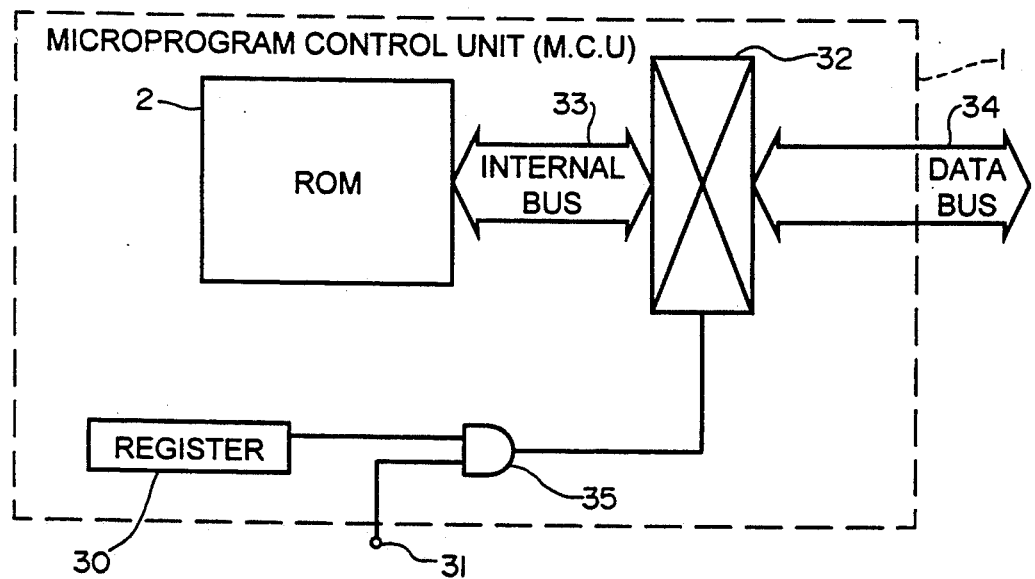
FIG. 1 is a construction block diagram of a conventional protective device for ROM data.
Figure 2:
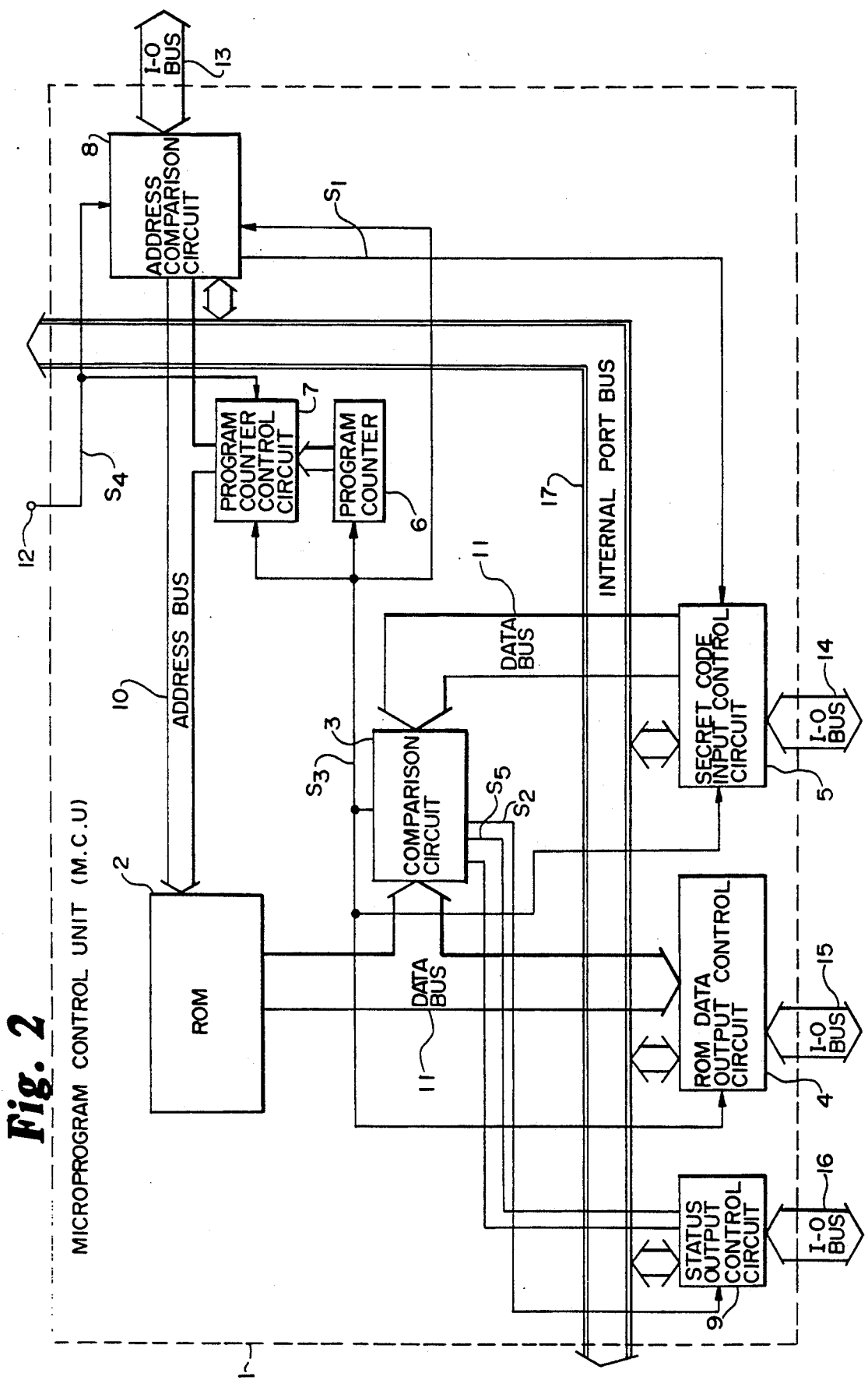
FIG. 2 is a construction block diagram of a protective device for ROM data according to the invention.

As shown in FIG. 2, ROM 2 is connected to ROM data output control circuit 4 through data bus 11, and to program counter control circuit 7 and to secret code address comparison circuit 8 through address bus 10. The comparison circuit 3 is connected to status output control circuit 9 in order to output the signals $S_2$ $S_5$ which matches the status and the secret code data. Said comparison circuit 3 is also commonly connected to ROM data output control circuit 4, secret code input control circuit 5, program counter 6, program counter control circuit 7 and secret code address comparison circuit 8 in order to transfer its output signal. The comparison circuit 3 is further connected, through data bus 11, to secret code input control circuit 5.

The secret code address comparison circuit 8, which is connected to input-output bus 13 and to program counter control circuit 7 into which the count signal outputted from program counter 6 is inputted, is connected to mode control input pin 12 in order to input a mode control signal $S_4$.

Also, the secret code address comparison circuit 8 is connected to secret code input control circuit 5 in order to transfer address matching signal $S_1$. Said secret code address comparison circuit 8 is also connected, through internal port bus 17, to secret code input control circuit 5, to ROM data output control circuit 4 and to status output control circuit 9.

Figure 3:
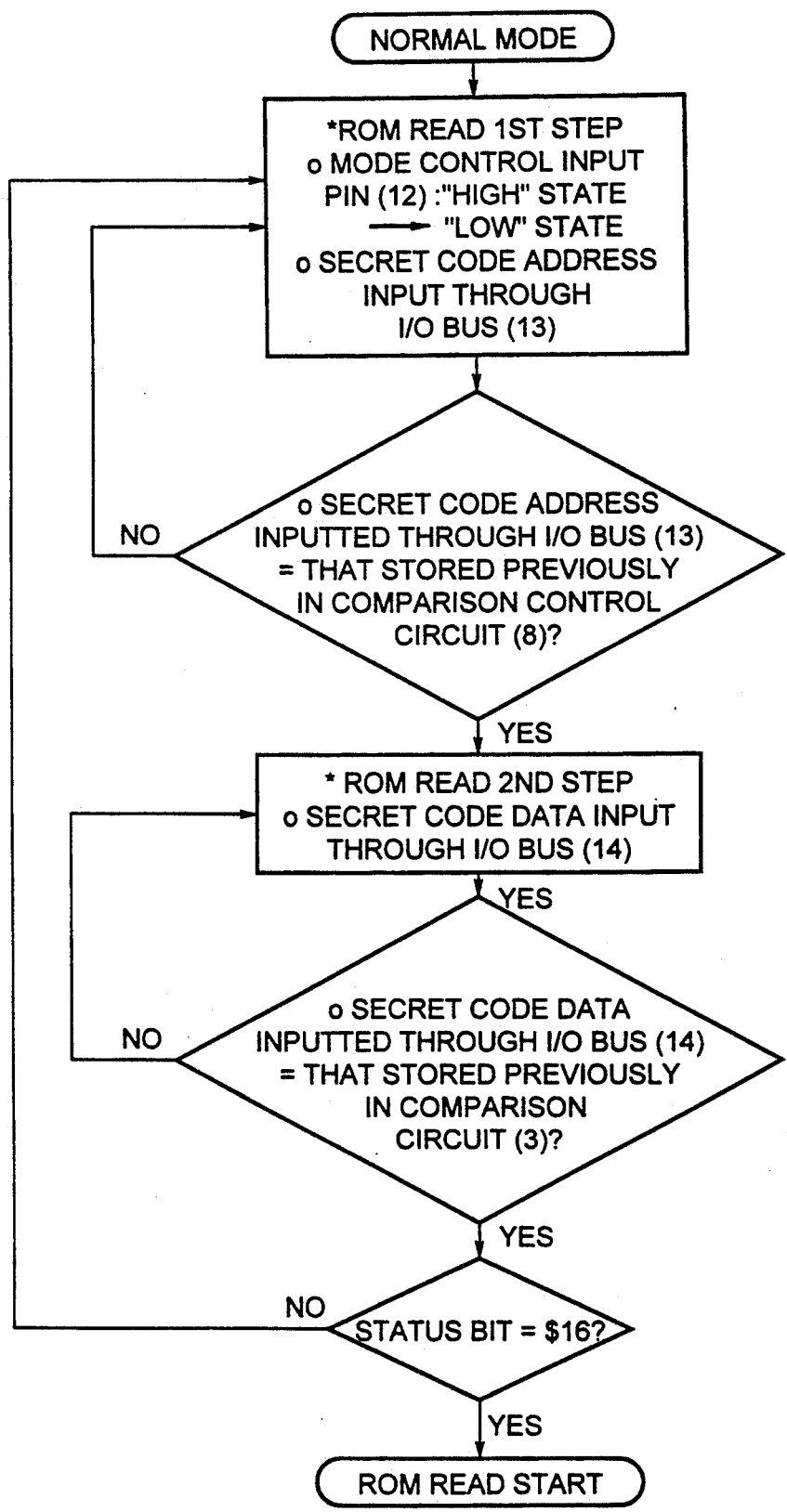
FIG. 3 is a flow chart showing the operation procedure of the device according to the invention.

The operation procedure of the protective device having the construction as stated above according to the invention will be described with reference to FIG. 3.

In case the data stored in ROM 2 is to be read outside the chip, the mode control signal $S_4$ which is inputted through mode control signal input pin 12 is converted from high state to low state.

Then, the connection between program counter control circuit 7 and address bus 10 is broken and the secret code address comparison circuit 8 into which secret code address was inputted through input-output bus 13 begins to work.

At this time, the secret code address, which is inputted through input-output bus 13, is compared with that which was stored previously in said secret code address comparison circuit 8, and then it is applied to ROM 2 via address bus 10 if they agree with each other.

And, the address matching signal $S_1$ from the secret code address comparison circuit 8 is applied to second code input control circuit 5, and then permits the secret code data to be inputted into comparison circuit 3 through input-output bus 14 and internal data bus 11.

When the secret code data is inputted, the comparison circuit 3 compares it with the stored secret code data which is received from ROM 2 through data bus 11, and then if these data agree with each other, comparison circuit 3 transmits a secret code data matching signal $S_2$ to status output control circuit 9. This permits the output of status signal of 4 bits to outside through status output control circuit 9 and input-output bus 16.

The comparison circuit 3 also checks the state of status bit $S_5$ and outputs a signal $S_3$ to reset program counter 6. Consequently, the address becomes "0", and then it is transferred to address bus 10.

Said output signal $S_3$ is applied to, in addition to program counter 6, said secret code address comparison circuit 8, ROM data output control circuit 4 and secret code input control circuit 5. As a result thereof, input-output buses 13, 14, and 15 perform their normal input-output functions, making it possible to read data from ROM 2.

As stated above, the device and method for protecting data stored in ROM according to the invention are very useful in protecting the data of systems requiring high security by writing a secret code into user program and specific address, respectively, so that ROM data can be protected dually by address and data, into which the secret code is written previously.

What is claimed is:

1. A method for protecting data stored in a ROM of a microprogram control unit comprising the steps of:
   writing predetermined code data into a specific address of the ROM;
   checking whether a code address inputted from outside the microprogram control unit agrees with the specific address where the predetermined code data was stored;
   checking whether code data inputted from outside the microprogram control unit agrees with the predetermined code data after the inputted code address is determined to agree with the specific address where the predetermined code data was stored;
   changing a status bit from a first state to a second state after the inputted code data is determined to agree with the predetermined code data;
   denying access to the data stored in the ROM when the status bit is set to the first state; and
   allowing data stored in the ROM to be read outside of the microprogram control unit only when the status bit is set to the second state.

2. A device for protecting data stored in a ROM of a microprogram control unit comprising:
   a) a code address comparison circuit which, after receiving a mode control signal from outside of the microprogram control unit indicating an attempt to read the data stored in the ROM,
      i) checks whether a code address inputted from outside the microprogram control unit agrees with a predetermined code address previously stored in the code address comparison circuit, and then
      ii) outputs an address matching signal and the stored predetermined code address when the inputted code address agrees with the stored predetermined code address;
   b) a ROM which outputs predetermined code data stored at the predetermined code address after the ROM receives the predetermined code address outputted from the code address comparison control circuit;
   c) a comparison circuit which
      i) compares the predetermined code data outputted from the ROM with code data inputted from outside the microprogram control unit, and when the predetermined code data and the inputted code data agree with each other,
      ii) outputs a code data matching signal to cause a status bit, which is outputted outside the microprogram control unit and which has two states, to change from one state to the other state and, at the same time,
      iii) checks the state of the status bit and, when the status bit is set to a predetermined state, then
      iv) outputs an address reset signal to enable data stored in the ROM to be read to outside the microprogram control unit; and
   d) a program counter which
      i) deactivates when the program counter receives the mode control signal, and which
      ii) activates and resets an internal address counter to zero when the program counter receives the address reset signal.

3. A device according to claim 2 for protecting data stored in a ROM of a microprogram control unit, further comprising:
   e) a code input control circuit which allows code data inputted from outside the microprogram control unit to reach the comparison circuit only after the code input control circuit receives the address matching signal.

4. A device according to claim 2 for protecting data stored in a ROM of a microprogram control unit, further comprising:
   e) a ROM data output control circuit which allows data from the ROM to be outputted to outside the microprogram control unit only after the ROM data output control circuit receives the address reset signal.

5. A device according to claim 2 for protecting data stored in a ROM of a microprogram control unit, further comprising:
   e) a status output control circuit which outputs the value of the status bit to outside the microprogram control unit after the status output control circuit receives the code data matching signal.

6. A device for protecting data stored in a ROM of a microprogram control unit by preventing the data from being read outside of the device until after an appropriate inputted address and an appropriate inputted code are received by the device, the device comprising:
   the ROM containing the data and having predetermined code data at a predetermined address;
   an input-output bus;
   an address comparison circuit connected to the input-output bus for comparing with the predetermined address the inputted address which is inputted on the input-output bus;
   an address bus connected between the address comparison circuit and the ROM which carries the predetermined address from the address comparison circuit to the ROM when the inputted address matches the predetermined address;

a data bus connected to the ROM which carries the data from the ROM when an address associated with the data is received by the ROM on the address bus; and a code data comparison circuit, connected to the data bus and the input-output bus, which receives the predetermined code data on the data bus after the ROM receives the predetermined address on the address bus, and which compares the predetermined code data with the inputted code data which is inputted on the input-output bus;

a data access controlling means for controlling access to the ROM by
 a) preventing the ROM from receiving addresses directly from the input-output bus, so that the ROM is incapable of outputting ROM data, before the address comparison means determines that the predetermined address matches the inputted address and the code data comparison means determines that the predetermined code data matches the inputted code data, and
 b) allowing the ROM to receive addresses directly from the input-output bus and output ROM data after the address comparison means determines that the predetermined address matches the inputted address and the code data comparison means determines that the predetermined code data matches the inputted code data.

7. The device of claim 6 further comprising:

a status output control circuit connected to the input-output bus and having a status bit with two states; and a code data matching signalling means for carrying a code data matching signal from the code data comparison circuit to the status output control circuit when the predetermined code data matches the inputted code data, the status output control circuit outputting a status signal on the input-output bus and changing the state of the status bit when the status output control circuit receives the code data matching signal.

8. The device of claim 7 further comprising:

a code input control circuit connected between the code data comparison circuit and the input-output bus; and an address matching signalling means for carrying an address matching signal from the address comparison circuit to the code input control circuit when the inputted address matches the predetermined address, the code input control circuit allowing code data to travel from the input-output bus to the code data comparison circuit only after the code input control circuit receives the address matching signal.

9. The device of claim 8 further comprising:

a status bit signalling means connected from the status output control circuit to the code data comparison circuit for indicating the current state of the status bit of the status output control circuit;

a ROM data output control circuit connected between the data bus and the input-output bus; and an output signalling means for carrying an output signal from the code data comparison circuit to the address comparison circuit and the ROM data output control circuit when the status bit signalling means indicates to the code data comparison circuit that the status bit of the status output control circuit has ben changed, the address comparison circuit and the ROM data output control circuit allowing the ROM data to be outputted to the input-output bus only after the output signal is received.

10. The device of claim 9 further comprising:

a mode control input pin adapted for receiving an input signal having a first and second state; and a mode control signalling means for carrying a mode control signal from the mode control input pin to the address comparison circuit to indicate when the input signal on the mode control input pin is converted from the first state to the second state, the address comparison circuit comparing the address inputted on the input-output bus with the predetermined address only after the address comparison circuit receives the mode control signal.

* * * * *